US009668250B2

(12) United States Patent
Fujita

(10) Patent No.: US 9,668,250 B2
(45) Date of Patent: May 30, 2017

(54) WIRELESS COMMUNICATION SYSTEM, MASTER COMMUNICATION DEVICE, SLAVE COMMUNICATION DEVICE, AND CHANNEL ALLOCATION INFORMATION NOTIFICATION METHOD

(75) Inventor: Hiroki Fujita, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 718 days.

(21) Appl. No.: 13/577,206

(22) PCT Filed: Feb. 2, 2011

(86) PCT No.: PCT/JP2011/052153
§ 371 (c)(1),
(2), (4) Date: Aug. 3, 2012

(87) PCT Pub. No.: WO2011/096437
PCT Pub. Date: Aug. 11, 2011

(65) Prior Publication Data
US 2012/0307769 A1 Dec. 6, 2012

(30) Foreign Application Priority Data

Feb. 5, 2010 (JP) .................................. 2010-024812

(51) Int. Cl.
*H04W 72/04* (2009.01)
*H04L 5/00* (2006.01)
*H04L 27/26* (2006.01)

(52) U.S. Cl.
CPC ......... *H04W 72/042* (2013.01); *H04L 5/0094* (2013.01); *H04L 27/2602* (2013.01); *H04W 72/0453* (2013.01)

(58) Field of Classification Search
CPC ............................ H04W 72/042; H04L 5/0094
See application file for complete search history.

(56) References Cited

U.S. PATENT DOCUMENTS

2006/0013184 A1 1/2006 Utsunomiya et al.
2008/0205364 A1* 8/2008 Park ..................... H04B 7/2656
370/338
(Continued)

FOREIGN PATENT DOCUMENTS

CN 101056156 A 10/2007
CN 101282294 A 10/2008

OTHER PUBLICATIONS

The First Office Action issued by the Chinese Patent Office on Jun. 4, 2014, which corresponds to Chinese Patent Application No. 201180008350.7 and is related to U.S. Appl. No. 13/577,206; with English language concise explanation.

(Continued)

*Primary Examiner* — Marcus R Smith
(74) *Attorney, Agent, or Firm* — Studebaker & Brackett PC

(57) ABSTRACT

A base station allocates at least one of a plurality of wireless channels included in a used frequency hand to a mobile station. The base station includes: a used frequency hand determination unit for determining at least a part of a predetermined frequency band as the used frequency band; a message generation unit for generating a control message including used frequency band information which is placed in a predetermined position and which indicates the determined used frequency hand, and channel allocation information which has a size corresponding to a bandwidth of the used frequency band and which indicates the wireless channel to be allocated to the mobile station; and a modem and a wireless communication unit for transmitting the generated control message to the mobile station.

19 Claims, 8 Drawing Sheets

(56) References Cited

U.S. PATENT DOCUMENTS

| | | | |
|---|---|---|---|
| 2009/0170522 A1* | 7/2009 | Tirkkonen et al. | 455/452.1 |
| 2010/0008310 A1* | 1/2010 | Gerstenberger | H04W 72/042 |
| | | | 370/329 |
| 2010/0165933 A1* | 7/2010 | Fukui | H04W 72/0486 |
| | | | 370/329 |
| 2011/0249644 A1* | 10/2011 | Boariu et al. | 370/329 |
| 2012/0327888 A1* | 12/2012 | Sankar et al. | 370/329 |

OTHER PUBLICATIONS

Association of Radio Industries and Businesses; "OFDMA/TDMA TDD Broadband Wireless Access System (Next Generation PHS) ARIB STD-T95 Version 1.2"; Mar. 18, 2009.

The International Preliminary Report on Patentability and the Written Opinion of the International Searching Authority with mailing date of Sep. 27, 2012; International Application No. PCT/JP2011/052153.

\* cited by examiner

FIG.3

|  | Slot1 | Slot2 | Slot3 | Slot4 | TIME |
|---|---|---|---|---|---|
| Sch1 | PRU1 | PRU2 | PRU3 | PRU4 | |
| Sch2 | PRU5 | PRU6 | PRU7 | PRU8 | USED FREQUENCY BAND |
| Sch3 | PRU9 | PRU10 | PRU11 | PRU12 | |
| Sch4 | PRU13 | PRU14 | PRU15 | PRU16 | |
| Sch5 | PRU17 | PRU18 | PRU19 | PRU20 | |
| Sch6 | PRU21 | PRU22 | PRU23 | PRU24 | |
| Sch7 | PRU25 | PRU26 | PRU27 | PRU28 | |
| Sch8 | PRU29 | PRU30 | PRU31 | PRU32 | |
| Sch9 | PRU33 | PRU34 | PRU35 | PRU36 | |
| Sch10 | PRU37 | PRU38 | PRU39 | PRU40 | |
| Sch11 | PRU41 | PRU42 | PRU43 | PRU44 | |
| Sch12 | PRU45 | PRU46 | PRU47 | PRU48 | |
| Sch13 | PRU49 | PRU50 | PRU51 | PRU52 | |
| Sch14 | PRU53 | PRU54 | PRU55 | PRU56 | |
| Sch15 | PRU57 | PRU58 | PRU59 | PRU60 | |
| Sch16 | PRU61 | PRU62 | PRU63 | PRU64 | |
| Sch17 | PRU65 | PRU66 | PRU67 | PRU68 | |
| Sch18 | PRU69 | PRU70 | PRU71 | PRU72 | |

FREQUENCY

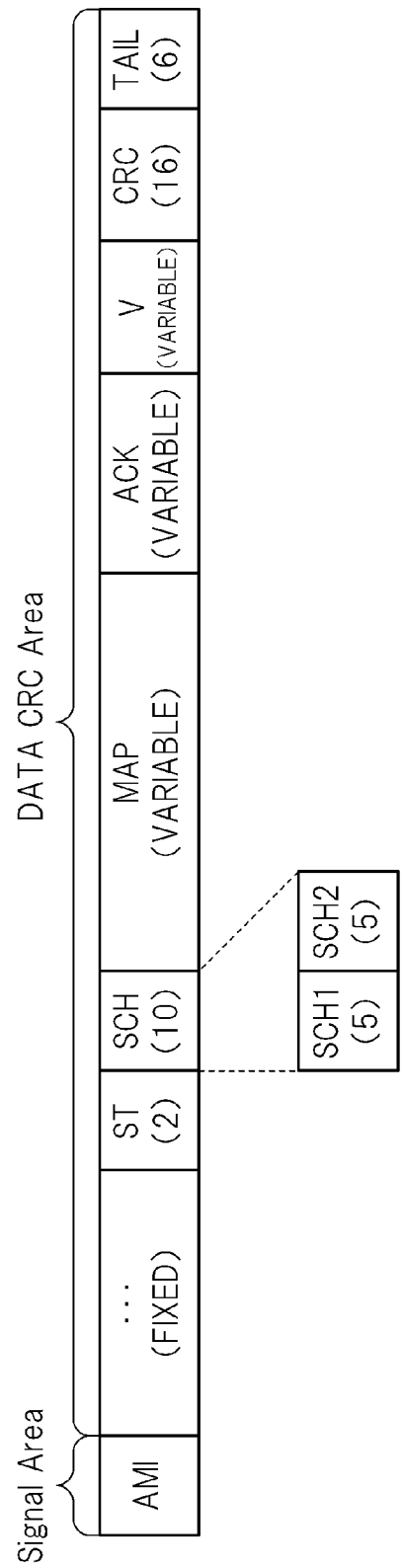

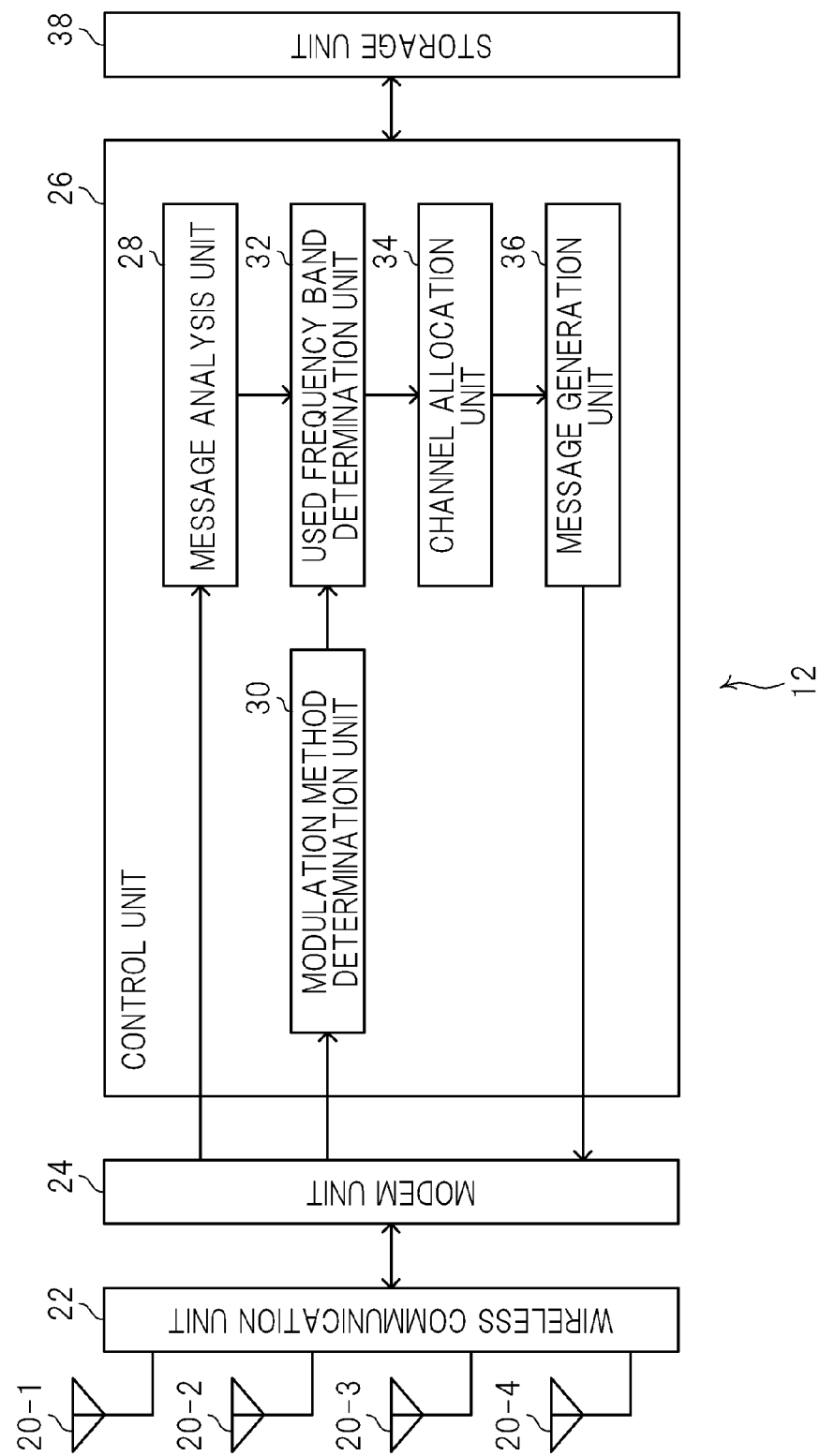

FIG.6

| WIRELESS QUALITY | MODULATION METHOD |
|---|---|
| ... | BPSK(1/2) |
| ... | BPSK(2/3) |
| ... | QPSK(1/2) |
| ... | QPSK(3/4) |

FIG.7

| MODULATION METHOD | USED SUBCHANNEL COUNT |
|---|---|
| BPSK(1/2) | 1 |
| | 2 |
| | ⋮ |
| | 7 |
| BPSK(2/3) | 8 |
| | 9 |
| | ⋮ |
| | 14 |
| QPSK(1/2) | 15 |
| | 16 |
| | ⋮ |
| | 28 |
| QPSK(3/4) | 29 |
| | 30 |
| | 31 |
| | 32 |

FIG.9

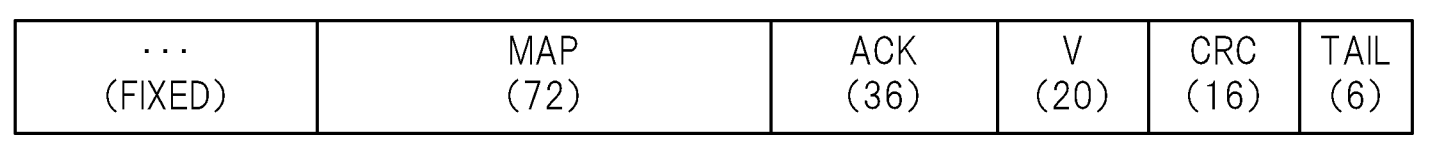

| ... (FIXED) | MAP (72) | ACK (36) | V (20) | CRC (16) | TAIL (6) |

WIRELESS COMMUNICATION SYSTEM, MASTER COMMUNICATION DEVICE, SLAVE COMMUNICATION DEVICE, AND CHANNEL ALLOCATION INFORMATION NOTIFICATION METHOD

TECHNICAL FIELD

The present invention relates to a wireless communication system, a master communication device, a slave communication device, and a channel allocation information notification method.

BACKGROUND ART

In a wireless communication system, in general, a master communication device determines a wireless channel to be allocated to a slave communication device. Then, the master communication device transmits a control message including channel allocation information indicating the wireless channel to the slave communication device.

For example, in extended Global Platform (XGP) that employs an orthogonal frequency division multiple access (OFDMA) method and a time division multiple access/time division duplex (TDMA/TDD) method, the control message illustrated in FIG. 9 is transmitted from a base station to a mobile station for each frame (see, for example, Non-patent Document 1).

In the control message illustrated in FIG. 9, a "MAP" corresponds to the channel allocation information. The MAP is information indicating presence/absence of allocation of each of a plurality of wireless channels to the mobile station, which are predefined for a predetermined frequency band. Here, the MAP is a 72-bit bitmap in which, of 72 wireless channels, the wireless channel allocated as a communication channel is indicated as "1" and the wireless channel that is not allocated as the communication channel is indicated as "0". Further, an "ACK" is information indicating presence/absence of an error in each of user data pieces transmitted from the mobile station via the communication channel. The ACK is a 36-bit bitmap in which, of the user data pieces subjected to error detection for every two wireless channels adjacent to each other in a frequency direction, the user data piece from which no error has been detected is indicated as "1" and the user data piece from which an error has been detected is indicated as "0". A "V" is information indicating a maximum number of wireless channels that can be allocated in each of a plurality of time slots.

CITATION LIST

Non Patent Literature

[NPL 1] ARIB STD-T95 Version 1.2 "OFDMA/TDMA TDD Broadband Wireless Access System (Next Generation-PHS)", 18 Mar. 2009, Association of Radio Industries and Businesses

SUMMARY OF INVENTION

Technical Problem

In a conventional wireless communication system, a size of channel allocation information is defined on the premise that an upper edge and a lower edge of a frequency band (hereinafter, referred to as "used frequency band") used for wireless communications between a master communication device and a slave communication device are fixed. For that reason, in the conventional wireless communication system, when a used frequency bandwidth is changed in the middle, it is necessary to newly redefine a format of a control message including the channel allocation information.

For example, the MAP (channel allocation information) illustrated in FIG. 9 is specified on the premise that the used frequency bandwidth is 16.2 MHz. Therefore, for example, when the used frequency bandwidth is enlarged to 30 MHz to increase the number of wireless channels that can be allocated to mobile stations, the size of the MAP becomes insufficient. In contrast, when the used frequency bandwidth is reduced to 10 MHz to decrease the number of wireless channels that can be allocated to mobile stations, wasteful room occurs in the size of the MAP.

The present invention has been made in view of the above-mentioned problem, and an object thereof is to provide a wireless communication system, a master communication device, a slave communication device, and a channel allocation information notification method, which can flexibly handle a change of a used frequency bandwidth without redefining a format of a control message including channel allocation information.

Solution to Problem

In order to solve the above-mentioned problem, there is provided a wireless communication system, including: a master communication device; and a slave communication device, the master communication device allocating at least one of a plurality of wireless channels included in a used frequency band to the slave communication device, in which: the master communication device includes: frequency band determination means for determining at least apart of a predetermined frequency band as the used frequency band; generation means for generating a control message including used frequency band information which is placed in a predetermined position and which indicates the used frequency band determined by the frequency band determination means, and channel allocation information which has a size corresponding to a bandwidth of the used frequency band and which indicates the wireless channel to be allocated to the slave communication device; and transmission means for transmitting the control message generated by the generation means to the slave communication device; and the slave communication device includes: reception means for receiving the control message transmitted from the master communication device; acquisition means for acquiring the channel allocation information from the control message based on the used frequency band information placed in the predetermined position of the control message received by the reception means; and means for performing wireless communications to/from the master communication device via the wireless channel indicated by the channel allocation information acquired by the acquisition means.

In the present invention, the master communication device transmits the control message including the channel allocation information having a size corresponding to a bandwidth of the used frequency band to the slave communication device. Therefore, according to the present invention, it is possible to flexibly handle the change of the used frequency bandwidth without redefining the format of the control message.

Further, according to an aspect of the present invention, the wireless communication system may further include modulation method determination means for determining a modulation method of a control channel included in the used frequency band based on reception quality of a radio signal transmitted from the slave communication device via the control channel, the frequency band determination means may determine the used frequency bandwidth based on the modulation method determined by the modulation method determination means, and the transmission means may transmit via the control channel the control message modulated by the modulation method determined by the modulation method determination means.

According to this aspect, it is possible to change the used frequency bandwidth according to the change of the wireless state of the control channel, without redefining the format of the control message. For example, when the wireless state of the control channel is satisfactory, a modulation method exhibiting a high transmission efficiency can be applied to the control channel, and hence the size of the control message transmitted via the control channel can be enlarged, according to which the size of the channel allocation information included in the control message can also be enlarged. Further, when the size of the channel allocation information is enlarged, the used frequency bandwidth can also be enlarged. That is, when the wireless state of the control channel is satisfactory, the used frequency bandwidth can be enlarged. In contrast, when the wireless state of the control channel deteriorates, it is desired that the used frequency bandwidth be reduced.

According to an aspect of the present invention, the frequency band determination means may determine the used frequency bandwidth based on a frequency bandwidth that can be used by the slave communication device.

According to this aspect, the master communication device can perform wireless communications to/from various slave communication devices whose frequency bands that can be used are different from one another, without redefining the format of the control message.

Further, according to an aspect of the present invention, each of the plurality of wireless channels may belong to any one of a plurality of subchannels predefined for the predetermined frequency band, and the used frequency band information may include information indicating a range of the subchannels belonging to the used frequency band among the plurality of subchannels.

Further, according to an aspect of the present invention, the used frequency band information may include information indicating the subchannel corresponding to an upper edge of the used frequency band and the subchannel corresponding to a lower edge of the used frequency band.

Further, according to an aspect of the present invention, the channel allocation information may include information indicating presence/absence of allocation of each of the plurality of wireless channels to the slave communication device.

Further, according to an aspect of the present invention, the control message generated by the generation means may further include information indicating presence/absence of an error in each of data pieces transmitted from the slave communication device via the wireless channel allocated to the slave communication device.

According to this aspect as well, it is possible to flexibly handle the change of the used frequency bandwidth without redefining the format of the control message.

Further, according to an aspect of the present invention, each of the plurality of wireless channels may belong to any one of a plurality of time slots predefined for a predetermined time period, and the control message generated by the generation means may further include information indicating a maximum number of wireless channels that can be allocated in each of the plurality of time slots.

According to this aspect as well, it is possible to flexibly handle the change of the used frequency bandwidth without redefining the format of the control message.

According to the present invention, there is also provided a master communication device, which allocates at least one of a plurality of wireless channels included in a used frequency band to a slave communication device, including: frequency band determination means for determining at least a part of a predetermined frequency band as the used frequency band; generation means for generating a control message including used frequency band information which is placed in a predetermined position and which indicates the used frequency band determined by the frequency band determination means, and channel allocation information which has a size corresponding to a bandwidth of the used frequency band and which indicates the wireless channel to be allocated to the slave communication device; and transmission means for transmitting the control message generated by the generation means to the slave communication device.

According to the present invention, there is also provided a slave communication device, to which at least one of a plurality of wireless channels included in a used frequency band is allocated from a master communication device, including: reception means for receiving from the master communication device a control message including used frequency band information which is placed in a predetermined position and which indicates the used frequency band, and channel allocation information which has a size corresponding to a bandwidth of the used frequency band and which indicates the wireless channel to be allocated to the slave communication device; acquisition means for acquiring the channel allocation information from the control message based on the used frequency band information placed in the predetermined position of the control message received by the reception means; and means for performing wireless communications to/from the master communication device via the wireless channel indicated by the channel allocation information acquired by the acquisition means.

According to the present invention, there is also provided a channel allocation information notification method for allocating, by a master communication device, at least one of a plurality of wireless channels included in a used frequency band to a slave communication device, including the steps of: determining at least apart of a predetermined frequency band as the used frequency band; generating, by the master communication device, a control message including used frequency band information which is placed in a predetermined position and which indicates the determined used frequency band, and channel allocation information which has a size corresponding to a bandwidth of the used frequency band and which indicates the wireless channel to be allocated to the slave communication device; transmitting, by the master communication device, the generated control message to the slave communication device; receiving, by the slave communication device, the control message transmitted from the master communication device; acquiring, by the slave communication device, the channel allocation information from the received control message based on the used frequency band information placed in the predetermined position of the control message; and performing, by the slave communication device, wireless communications to/from the master communication device via the wireless channel indicated by the acquired channel allocation information.

BRIEF DESCRIPTION OF DRAWINGS

[FIG. 3] A diagram illustrating an example of a used frequency band.

[FIG. 4] A diagram illustrating an example of a control message according to the embodiment.

[FIG. 5] A functional block diagram of a base station according to the embodiment.

[FIG. 6] A diagram illustrating an example of a table that defines a correlation between reception quality of a radio signal and a modulation method.

[FIG. 7] A diagram illustrating an example of a table that defines a correlation between the modulation method and a used subchannel count.

[FIG. 9] A diagram illustrating an example of a control message defined in an XGP.

DESCRIPTION OF EMBODIMENTS

Hereinafter, an embodiment of the present invention is described in detail with reference to the accompanying drawings.

Figure 1:
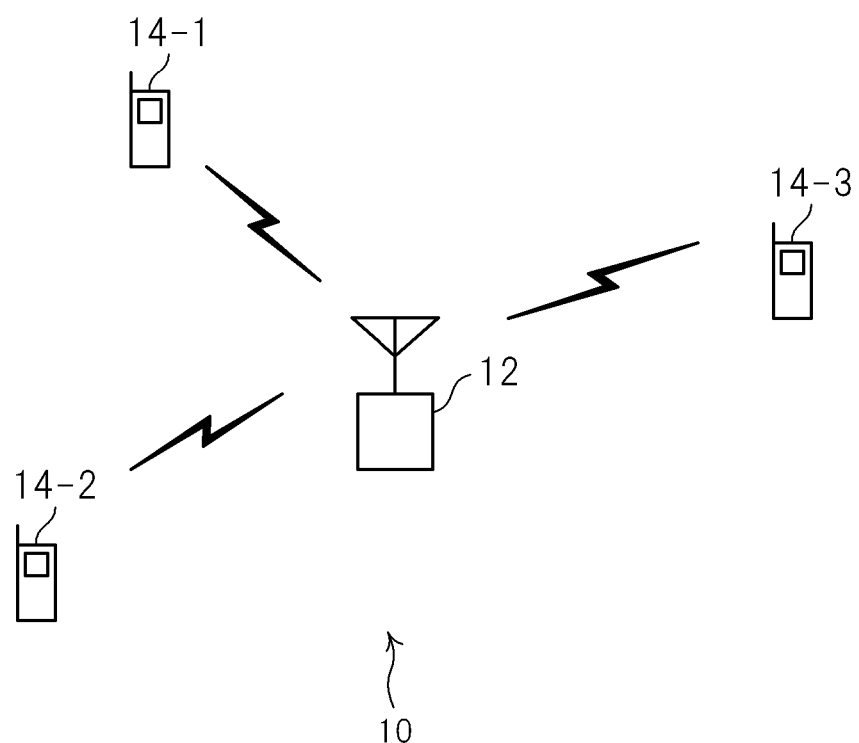
[FIG. 1] A diagram illustrating a configuration of a mobile communication system according to an embodiment of the present invention.

FIG. 1 is a diagram illustrating a configuration of a mobile communication system 10 according to the embodiment of the present invention. As illustrated in FIG. 1, the mobile communication system 10 includes a base station 12 and a plurality of mobile stations 14 (only mobile stations 14-1 to 14-3 are illustrated here).

The base station 12 (master communication device) performs wireless communications to/from the mobile station 14 (slave communication device) located in a cell of the base station 12 by an OFDMA method and a TDMA/TDD method. Note that, the mobile station 14 corresponds to a cellular telephone, a network card, a portable information terminal incorporating a communication function, or the like.

Figure 2:
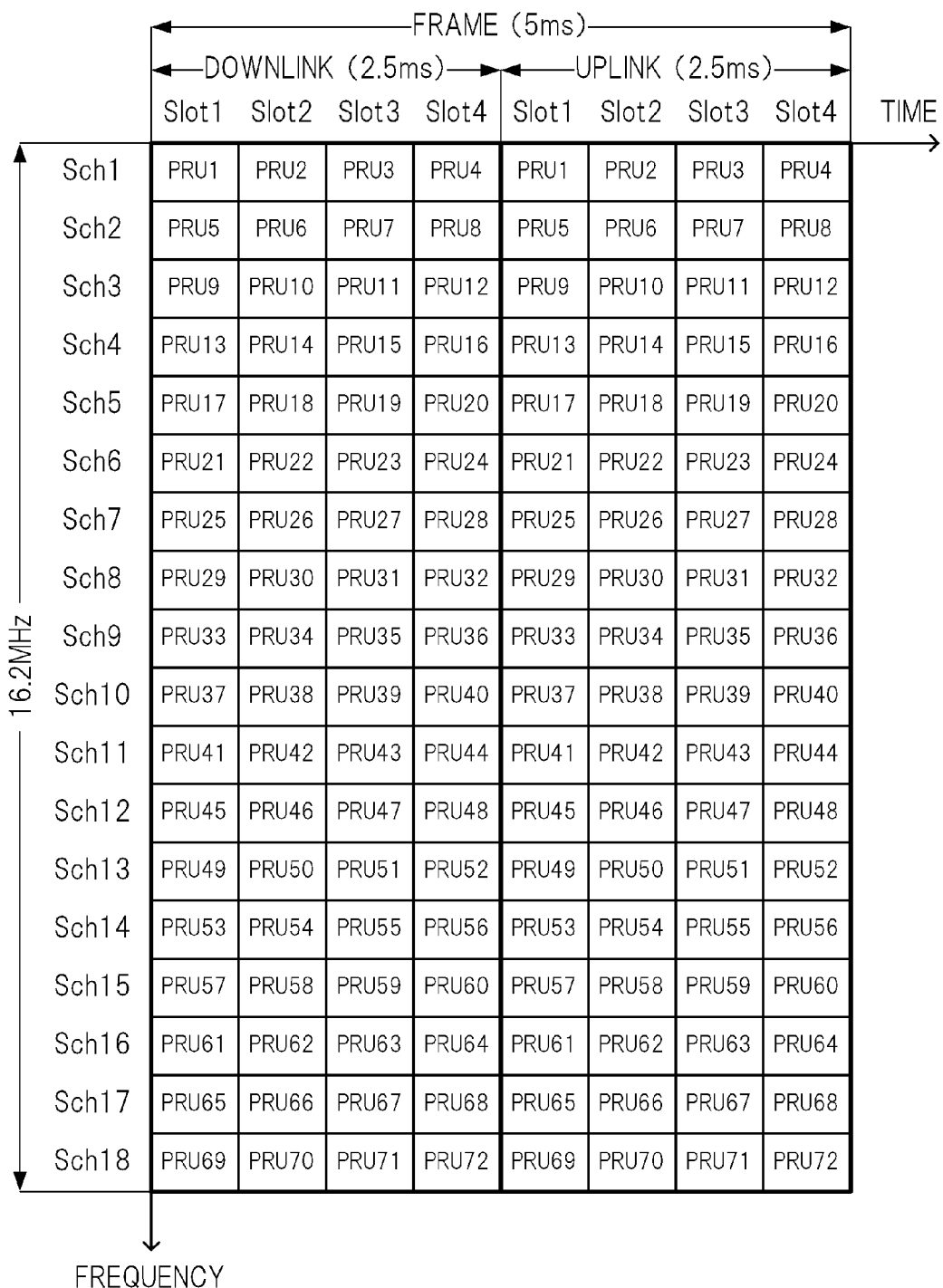
[FIG. 2] A diagram illustrating a wireless channel structure in the mobile communication system according to the embodiment.

FIG. 2 is a diagram illustrating a wireless channel structure in the mobile communication system 10 (horizontal axis: time, vertical axis: frequency). As illustrated in FIG. 2, in the mobile communication system 10, a TDMA frame of a predetermined period (here, 5 ms) is segmented into a subframe for uplink (2.5 ms) and a subframe for downlink (2.5 ms). In addition, each of the subframes is segmented into a plurality of time slots (here, Slot1 to Slot4). Further, a plurality of OFDMA subchannels (here, Sch1 to Sch18) are predefined in a predetermined frequency band (here, having a bandwidth of 16.2 MHz).

Minimum units of the wireless channel allocated to the mobile stations 14 by the base station 12 are called physical resource units (PRUs). Each of the PRUs belongs to any one of the time slots (Slot1 to Slot4) and any one of the subchannels (Sch1 to Sch18). Note that, with regard to both the subframe for uplink and the subframe for downlink, 72 PRUs are defined so as to be identified by, for example, serial PRU numbers (1, 2, 3, . . . ) that start with 1. Further, the PRUs having the same PRU number are used in pair of up and down.

In the mobile communication system 10, the base station 12 determines the frequency band (used frequency band) to be used for the wireless communications to/from each of the mobile stations 14 from within the frequency band of the bandwidth of 16.2 MHz. The used frequency band is determined based on, for example, a frequency bandwidth that can be used by the mobile station 14.

FIG. 3 is a diagram illustrating an example of the used frequency band determined by the base station 12. In the example illustrated in FIG. 3, Sch2 to Sch4 are determined as the used frequency band from among Sch1 to Sch18 predefined for the frequency band of the bandwidth of 16.2 MHz.

The PRUs belonging to the used frequency band determined by the base station 12 are used as individual channels (ICHs) individually allocated to the mobile stations 14. The ICHs include an anchor channel (ANCH) which is obtained by allocating in principle one RPU to each of the mobile stations 14 as a control channel and is used mainly for transmission of a control message and an extra channel (EXCH) which is obtained by allocating one or more RPUs to each of the mobile stations 14 as a communication channel and is used mainly for transmission of user data.

The PRU for the ANCH (control channel) is notified of from the base station 12 to the mobile station 14 at a start of the communications (or may be changed during the communications). In contrast thereto, the PRUs for the EXCH (communication channel) are notified of from the base station 12 to the mobile station 14 via the ANCH by channel allocation information called a "MAP", which has a size corresponding to the used frequency bandwidth (used subchannel count) and indicates the PRUs for the EXCH allocated to the mobile station 14.

FIG. 4 is a diagram illustrating an example of the control message called an EXCH control channel (ECCH). The ECCH is a control message that is transmitted to the mobile station 14 for every frame or every plurality of frames in order that the base station 12 notifies the mobile station 14 of the PRU for the EXCH to be allocated thereto. The ECCH illustrated in FIG. 4 includes: the MAP, an "ACK", and a "V" whose sizes are changed depending on the used frequency bandwidth (used subchannel count); and an "ST", an "SCH", a "CRC" (cyclic redundancy check code added in order to detect an error from the user data), a "TAIL" (tail bits added in order to initialize a value of a shift register in an encoding circuit), and other information whose sizes are fixed.

Of those, the MAP is information indicating presence/absence of allocation to the mobile station 14 of each of the PRUs belonging to the used frequency band. Here, the MAP is a bitmap whose size is variable and in which the PRU allocated as the EXCH is indicated as "1" and the PRU that is not allocated as the EXCH is indicated as "0". Further, the ACK is information indicating presence/absence of the error in each of the user data pieces transmitted from the mobile station 14 via the EXCH allocated to the mobile station 14. Here, the ACK is a bitmap whose size is variable and in which, of the user data pieces subjected to error detection for every two PRUs adjacent to each other in a frequency direction, the user data piece from which no error has been detected is indicated as "1" and the user data piece from which an error has been detected is indicated as "0". The V is information indicating a maximum number of PRUs that can be allocated in each of the plurality of time slots (here, four time slots).

In this manner, in the mobile communication system 10, the base station 12 transmits to the mobile station 14 the control message (ECCH) including the channel allocation information (MAP) having the size corresponding to the used frequency bandwidth (used subchannel count). Therefore, it is possible to flexibly handle a change of the used frequency bandwidth without redefining a format of the control message.

Hereinafter, a configuration provided to the base station 12 in order to realize the above-mentioned processing is described specifically.

FIG. 5 is a functional block diagram of the base station 12. As illustrated in FIG. 5, the base station 12 includes antennas 20-1 to 20-4, a wireless communication unit 22, a modem unit 24, a control unit 26, and a storage unit 38.

The antennas 20-1 to 20-4 receive a radio signal transmitted from the mobile station 14, and output the received radio signal to the wireless communication unit 22. Further, the antennas 20-1 to 20-4 transmit the radio signal supplied from the wireless communication unit 22 to the mobile station 14.

The wireless communication unit 22 includes a low-noise amplifier, a power amplifier, a frequency converter, a band-pass filter, an A/D converter, and a D/A converter. The wireless communication unit 22 amplifies the radio signal input from the antennas 20-1 to 20-4 by the low-noise amplifier, then down-converts the radio signal into an intermediate frequency signal, further converts the intermediate frequency signal into a digital signal, and outputs the digital signal to the modem unit 24. Further, the wireless communication unit 22 converts the digital signal input from the modem unit 24 into an analog signal, then up-converts the analog signal into the radio signal, amplifies radio signal to a transmission output level by the power amplifier, and supplies radio signal to the antennas 20-1 to 20-4. Note that, reception and transmission of the radio signal are switched over by time division so as to correspond to the subframe for uplink and the subframe for downlink that are illustrated in FIG. 2, respectively.

The modem unit 24 includes a fast Fourier transform (FFT) unit, an inverse fast Fourier transform (IFFT) unit, a serial-parallel converter, a parallel-serial converter, an encoding circuit, and an error detection unit. The modem unit 24 subjects the digital signal input from the wireless communication unit 22 to serial-parallel conversion, removal of a guard interval (GI), primary demodulation (fast Fourier transform), parallel-serial conversion, secondary demodulation (symbol demapping), decoding, the error detection, and the like, and outputs the obtained reception data to the control unit 26. Further, the modem unit 24 subjects the transmission data and the message addressed to the mobile station 14 that are input from the control unit 26 to addition of an error detection code, encoding, primary modulation (symbol mapping), the serial-parallel conversion, secondary modulation (inverse fast Fourier transform), addition of the GI, the parallel-serial conversion, and the like, and outputs the obtained digital signal to the wireless communication unit 22. Note that, in a case where a multiple-input multiple-output (MIMO) method is further employed for the wireless communications between the base station 12 and the mobile station 14, the modem unit 24 performs MIMO decoding, MIMO precoding, and the like as well.

The control unit 26 is constituted by, for example, a CPU and a program for controlling an operation of the CPU, and controls the respective units of the base station 12. In particular, the control unit 26 functionally includes a message analysis unit 28, a modulation method determination unit 30, a used frequency band determination unit 32, a channel allocation unit 34, and a message generation unit 36. Further, the control unit 26 performs determination, notification, and the like of the used frequency band to be used for the wireless communications to/from the mobile station 14 and the PRU for the EXCH to be allocated to the mobile station 14.

The storage unit 38 is constituted by, for example, a semiconductor memory device, and stores programs, data, tables illustrated in FIG. 6 and FIG. 7, and the like which are necessary for the operation of the base station 12. Note that, FIG. 6 is a diagram illustrating an example of a table that defines a correlation between reception quality of the radio signal and a modulation method. Further, FIG. 7 is an example of a table that defines a correlation between the modulation method and the used subchannel count.

Here, a functional configuration of the control unit 26 is described in more detail.

The message analysis unit 28 identifies various messages from the mobile station 14 which are included in the reception data input from the modem unit 24, and analyzes contents of the messages. For example, the message analysis unit 28 identifies a connection request message (or link setting request message) from the mobile station 14, and acquires mobile station information indicating the frequency bandwidth that can be used by the mobile station 14 and the like from the connection request message.

The modulation method determination unit 30 determines the modulation method for the ANCH (control channel) based on the reception quality of the radio signal transmitted from the mobile station 14 via the ANCH (control channel). Used for the determination of the modulation method is, for example, the table (see FIG. 6) stored in the storage unit 38, which defines the correlation between the reception quality of the radio signal and the modulation method (the higher reception quality corresponds to the modulation method exhibiting the higher transmission efficiency, while the lower reception quality corresponds to the modulation method exhibiting the lower transmission efficiency). Note that, the reception quality of the radio signal includes a signal to interference and noise ratio (SINR) and a frame error rate (FER), and the like. Those kinds of reception quality can be acquired from a complex symbol string obtained by the modem unit 24 performing the primary demodulation (fast Fourier transform), a result of the error detection performed by the modem unit 24, and the like.

Note that, although it is apparent from the fact that the transmission efficiency of the data differs according to the modulation method, the modulation method for the ANCH determined by the modulation method determination unit 30 affects the size of the ECCH (control message) that can be transmitted via the ANCH, and resultantly affects even the size of the MAP (channel allocation information) included in the ECCH. Further, as described above, the MAP is the information indicating the presence/absence of allocation to the mobile station 14 of each of the PRUs belonging to the used frequency band, and hence the size of the MAP affects not only the number of PRUs that can be indicated by the MAP but also the used frequency bandwidth (used subchannel count) with respect to the mobile station 14. That is, the modulation method for the ANCH determined by the modulation method determination unit 30 also affects the used frequency bandwidth (used subchannel count) with respect to the mobile station 14. The table illustrated in FIG. 7 defines an example of the correlation between the modulation method and the used subchannel count.

The used frequency band determination unit 32 determines a part or an entirety of the frequency band of the bandwidth of 16.2 MHz (Sch1 to Sch18) illustrated in FIG. 2 as the used frequency band (used subchannels) to be used for the wireless communications to/from the mobile station 14. Specifically, the used frequency band determination unit 32 determines the used frequency band based on at least one of the "frequency bandwidth that can be used by mobile station 14" indicated by the mobile station information acquired by the message analysis unit 28 and the "modulation method for the ANCH (control channel)" determined by the modulation method determination unit 30.

For example, in a case where the "frequency bandwidth that can be used by mobile station 14" is 10 MHz, the used frequency band determination unit 32 may determine the used frequency band (used subchannels) with respect to the mobile station 14 from among Sch1 to Sch18 predefined for the frequency band of the bandwidth of 16.2 MHz so that the bandwidth becomes equal to or smaller than 10 MHz (in this embodiment, the used subchannel count becomes equal to or smaller than 11 after conversion because one subchannel has a width of 900 kHz). However, even in the case where the "frequency bandwidth that can be used by mobile station 14" is 10 MHz, when the "modulation method for the ANCH" is BPSK(½), it is desired that the used frequency band determination unit 32 determine the used frequency band (used subchannels) with respect to the mobile station 14 so that the used subchannel count becomes equal to or smaller than 7.

Further, in a case where the "modulation method for the ANCH" is QPSK(½), the used frequency band determination unit 32 may set an entirety of the frequency band of the bandwidth of 16.2 MHz (the used subchannel count 18) illustrated in FIG. 2 as the used frequency band with respect to the mobile station 14 based on the table illustrated in FIG. 7. However, even in the case where the "modulation method for the ANCH" is QPSK (½), when the "frequency bandwidth that can be used by mobile station 14" is 10 MHz, it is desired that the used frequency band determination unit 32 determine the used frequency band (used subchannels) with respect to the mobile station 14 so that the bandwidth becomes equal to or smaller than 10 MHz (used subchannel count becomes equal to or smaller than 11).

The channel allocation unit 34 allocates at least one of the PRUs included in the used frequency band determined by the used frequency band determination unit 32 to the mobile station 14 as the EXCH (communication channel). At this time, the channel allocation unit 34 may determine the PRU to be allocated to the mobile station 14 as the EXCH based on a result of carrier sense (interference signal measurement). For example, of a plurality of PRUs belonging to the used frequency band, the channel allocation unit 34 may determine the PRU whose interference signal level is lower than a predetermined value as a free channel, and may allocate at least one of the PRUs determined as the free channel to the mobile station 14 as the EXCH.

Note that, the used frequency band determination unit 32 may further reduce the used frequency bandwidth within a range including the PRU for the EXCH allocated to the mobile station 14 by the channel allocation unit 34.

The message generation unit 36 generates the control message and the transmission data addressed to the mobile station 14, and outputs the same to the modem unit 24. The ECCH illustrated in FIG. 4 is also an example of the control message generated by the message generation unit 36.

Figure 8:
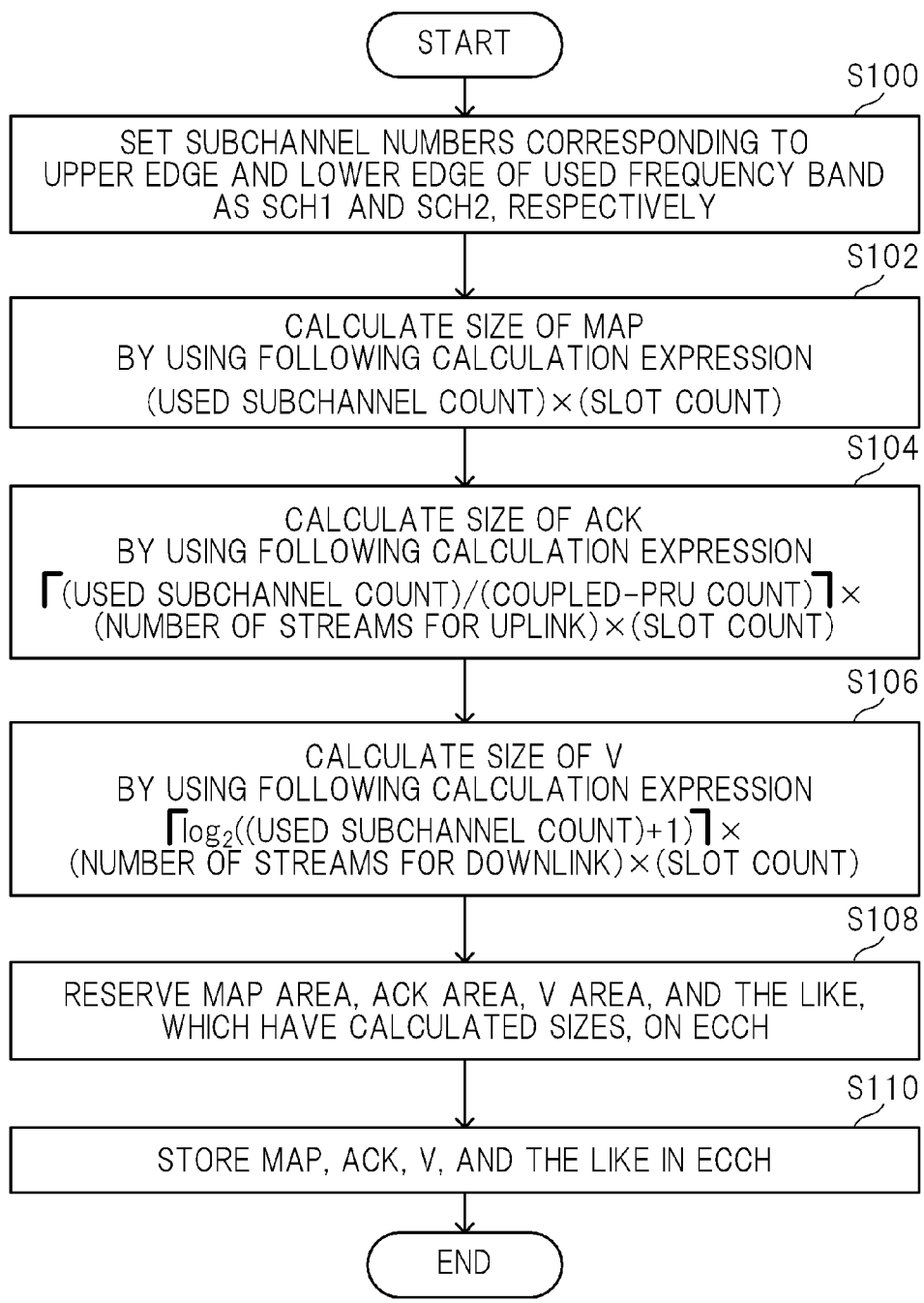
[FIG. 8] A flowchart illustrating an example of control message generation processing according to the embodiment.

Here, referring to FIG. 8, a specific description is made of ECCH (control message) generation processing performed by the message generation unit 36. This processing is started after the used frequency band (used subchannels) is determined by the used frequency band determination unit 32 and after the PRU allocated to the mobile station 14 as the EXCH (communication channel) is determined by the channel allocation unit 34.

As illustrated in FIG. 8, the message generation unit 36 sets subchannel numbers (here, values indicated in five bits) corresponding to an upper edge and a lower edge of the used frequency band determined by the used frequency band determination unit 32 as SCH1 and SCH2, respectively, and places SCH1 and SCH2 in predetermined positions (SCH area illustrated in FIG. 4) of the ECCH (S100). Stored in an ST area illustrated in FIG. 4 (here, 2-bit area) is the number (one when MIMO communications are not performed) of streams for downlink by MIMO communications. Note that, the information (used frequency band information) placed in the SCH area is not limited to SCH1 and SCH2, and may be any information that indicates a range of the subchannels belonging to the used frequency band determined by the used frequency band determination unit 32. Examples of this information include the subchannel number corresponding to the upper edge of the used frequency band and a numerical value indicating the used frequency bandwidth.

Subsequently, the message generation unit 36 uses an expression illustrated in Step S102 of FIG. 8 to calculate the size (number of bits) of the MAP based on the used subchannel count (number represented by SCH2−SCH1+1) corresponding to the used frequency bandwidth and a slot count (here, four) (S102).

Further, the message generation unit 36 uses an expression illustrated in Step S104 of FIG. 8 to calculate the size (number of bits) of the ACK based on the used subchannel count, a coupled-PRU count (here, two) which is the number of PRUs adjacent to each other in the frequency direction necessary to transmit one of the user data pieces to which the CRC is added for the error detection, the number (one if MIMO communications are not performed) of streams for uplink by MIMO communications, and the slot count (here, four) (S104).

In addition, the message generation unit 36 uses an expression illustrated in Step S106 of FIG. 8 to calculate the size (number of bits) of the V based on the used subchannel count, the number (one if MIMO communications are not performed) of streams for downlink by MIMO communications, and the slot count (here, four) (S106).

After that, as illustrated in FIG. 4, the message generation unit 36 reserves on the ECCH a MAP area having the size calculated in Step S102, an ACK area having the size calculated in Step S104, and a V area having the size calculated in Step S106, followed by a CRC area (here, 16-bit area), a TAIL area (here, 6-bit area), and the like (S108).

Finally, the message generation unit 36 stores the corresponding information in each of the areas reserved in Step S108 (S110). For example, the MAP area stores the information indicating the presence/absence of allocation to the mobile station 14 of each of the PRUs belonging to the used frequency band. Here, stored as the information is the bitmap whose size is variable and in which the PRU allocated as the EXCH is indicated as "1" and the PRU that is not allocated as the EXCH is indicated as "0". Further, the ACK area stores the information indicating the presence/absence of an error in each of the user data pieces transmitted from the mobile station 14 via the EXCH allocated to the mobile station 14. Here, stored as the information is the bitmap whose size is variable and in which, of the user data pieces subjected to the error detection for every two PRUs adjacent to each other in the frequency direction, the user data piece from which no error has been detected is indicated as "1" and the user data piece from which an error has been detected is indicated as "0". Further, the V area stores the information indicating the maximum number of PRUs that can be allocated in each of the plurality of time slots (here, four time slots).

The ECCH (control message) generated in this manner is subjected to the primary modulation in the modem unit 24 by the modulation method determined by the modulation method determination unit 30. In addition, in the modem unit 24, the ECCH is subjected to the secondary modulation (inverse fast Fourier transform) and the like after a predetermined symbol (AMI illustrated in FIG. 4) indicating the modulation method is added to a head thereof. Then, the ECCH output from the modem unit 24 is transmitted to the mobile station 14 via the ANCH (control channel) by the wireless communication unit 22.

On the other hand, the mobile station 14 receives the ECCH returned from the base station 12 in response to a connection request to the base station 12. Subsequently, the mobile station 14 acquires the used frequency bandwidth (used subchannel count) to be used for the wireless communications to/from the base station 12 based on the subchannel numbers (used frequency band information) corresponding to the upper edge and the lower edge of the used frequency band placed in the predetermined position (SCH area illustrated in FIG. 4) of the received ECCH. Then, the mobile station 14 calculates the sizes of the MAP, the ACK, the V, and the like from the acquired used frequency bandwidth, and identifies the MAP area, the ACK area, and the V area, followed by the CRC area, the TAIL area, and the like, on the ECCH. Then, the wireless communications to/from the base station 12 are performed via the PRU for the EXCH indicated by the MAP stored in the identified MAP area.

According to the mobile communication system 10 described above, the base station 12 transmits the control message (ECCH) including the channel allocation information (MAP) having a size corresponding to the used frequency bandwidth (used subchannel count) to the mobile station 14, and hence it is possible to flexibly handle the change of the used frequency bandwidth without redefining the format of the control message.

Therefore, for example, even when the used frequency bandwidth is enlarged to increase the number of PRUs that can be allocated to the mobile station 14, the size of the MAP does not become insufficient. Further, even when the used frequency bandwidth is reduced to decrease the number of PRUs that can be allocated to the mobile station 14, no wasteful room occurs in the size of the MAP.

Note that, the present invention is not limited to the above-mentioned embodiment.

For example, the format of the control message illustrated in FIG. 4 is a mere example, and there are no limitations to the number, types, order positions of information storage areas structuring the control message as long as the control message includes: the used frequency band information which is placed in the predetermined position and which indicates the used frequency band determined by the used frequency band determination unit 32; and the channel allocation information which has the size corresponding to the used frequency bandwidth and which indicates the PRU to be allocated to the mobile station 14.

Further, the present invention can be applied not only to a mobile communication system that employs the OFDMA method and the TDMA/TDD method but also broadly to general wireless communication systems in which the master communication device allocates at least one of a plurality of wireless channels included in the used frequency band to the slave communication device.

The invention claimed is:

1. A wireless communication system, comprising;
   a base station; and
   a user device, wherein
   the base station is configured to allocate at least one of a plurality of wireless resources included in a used frequency band to the user device,
   the base station is further configured to transmit control information to the user device,
   the control information includes used frequency band information which indicates the used frequency band, and resource allocation information,
   the resource allocation information has bit number corresponding to a bandwidth of the used frequency band and indicates the wireless resource to be allocated to the user device,
   the used frequency band information is included in a field of the control information, which is different from another field of that in which the resource allocation information is included,
   the resource allocation information is different from the used frequency band information and indicates the allocated wireless resource, which is a part of the used frequency band, and
   the user device is configured to receive the control information and perform wireless communications to/from the base station using the wireless resource indicated by the resource allocation information.

2. The wireless communication system according to claim 1, further comprising modulation method determination means for determining a modulation method of a control channel included in the used frequency band based on reception quality of a radio signal transmitted from the user device via the control channel, wherein:
   the base station determines the used frequency bandwidth based on the modulation method determined by the modulation method determination means; and
   transmits via the control channel the control information modulated by the modulation method determined by the modulation method determination means.

3. The wireless communication system according to claim 1, wherein the base station determines the used frequency bandwidth based on a frequency bandwidth that can be used by the user device.

4. The wireless communication system according to claim 1, wherein:
   each of the plurality of wireless resources belongs to any one of a plurality of subchannels predefined for the predetermined frequency band; and
   the used frequency band information comprises information indicating a range of the subchannels belonging to the used frequency band among the plurality of subchannels.

5. The wireless communication system according to claim 4, wherein the used frequency band information comprises information indicating the subchannel corresponding to an upper edge of the used frequency band and the subchannel corresponding to a lower edge of the used frequency band.

6. The wireless communication system according to claim 1, wherein the resource allocation information comprises information indicating presence/absence of allocation of each of the plurality of wireless resources to the user device.

7. The wireless communication system according to claim 1, wherein the control information generated by the generation means further comprises information indicating presence/absence of an error in each of data pieces transmitted from the user device via the wireless channel allocated to the user device.

8. The wireless communication system according to claim 1, wherein:
each of the plurality of wireless resources belongs to any one of a plurality of time slots predefined for a predetermined time period; and
the control information generated by the generation means further comprises information indicating a maximum number of wireless channels that can be allocated in each of the plurality of time slots.

9. The wireless communication system according to claim 1, wherein the bit number is variable.

10. The wireless communication system according to claim 1, wherein the bit number is dynamic.

11. The wireless communication system according to claim 1, wherein the bit number is changeable.

12. The wireless communication system according to claim 1, wherein
the used frequency band is a frequency band capable of being used by the user terminal, and is a subset of a predetermined frequency band usable by the base station.

13. The wireless communication system according to claim 1, wherein
the base station allocates at least one of a plurality of wireless resources included in the used frequency band to the user terminal.

14. The wireless communication system according to claim 1, wherein
the resource allocation information identifies the at least one wireless resource included in the used frequency band, that has been allocated to the user terminal.

15. The wireless communication system according to claim 1, wherein
the resource allocation information field of the control information has a bit number that corresponds to the used frequency band.

16. The wireless communication system according to claim 1, wherein
the used frequency band is a frequency band capable of being used by the user terminal, and is a subset of a predetermined frequency band usable by the base station;
the base station allocates at least one of a plurality of wireless resources included in the used frequency band to the user terminal;
the resource allocation information identifies the at least one wireless resource included in the used frequency band, that has been allocated to the user terminal; and
the resource allocation information field of the control information has a bit number that corresponds to the used frequency band.

17. A base station, which allocates at least one of a plurality of wireless resources included in a used frequency band to a user device, the base station comprising:
a control unit including a processor; and
a transmitter configured to transmit control information to the user device;
the control information includes used frequency band information which indicates the used frequency band, and resource allocation information,
the resource allocation information has bit number corresponding to a bandwidth of the used frequency band and indicates the wireless resource to be allocated to the user device,
the used frequency band information is included in a field of the control information, which is different from another field of that in which the resource allocation information is included, and
the resource allocation information is different from the used frequency band information and indicates the allocated wireless resource, which is a part of the used frequency band.

18. A user device, to which at least one of a plurality of wireless resources included in a used frequency band is allocated from a base station, which receives control information from the base station, the user device comprising:
a transmitter configured to transmit radio signals to the base station; and
a receiver configured to receive the control information from the base station;
the control information includes used frequency band information, which indicates the used frequency band, and resource allocation information,
the resource allocation information has bit number corresponding to a bandwidth of the used frequency band and indicates the wireless resource to be allocated to the user device,
the used frequency band information is included in a field of the control information, which is different from another field of that in which the resource allocation information is included,
the resource allocation information is different from the used frequency band information and indicates the allocated wireless resource, which is a part of the used frequency band, and
the user device is configured to perform wireless communications to/from the base station using the wireless resource indicated by the resource allocation information.

19. A channel allocation information notification method for allocating, by a base station, at least one of a plurality of wireless resources included in a used frequency band to a user device, comprising the steps of:
transmitting, by the base station to the user device, control information, wherein
the control information includes used frequency band information, which indicates the used frequency band, and resource allocation information,
the resource allocation information has bit number corresponding to a bandwidth of the used frequency band and indicates the wireless resource to be allocated to the user device, and
the used frequency band information is included in a field of the control information which is different from a field of that in which the resource allocation information is included;
receiving, by the user device, the control information transmitted from the base station; and
performing, by the user device, wireless communications to/from the base station via the wireless resource indicated by the resource allocation information included in the control information.

* * * * *